J. BUTTERFIELD.
Self-Dropper for Planters.

No. 200,692.     Patented Feb. 26, 1878.

WITNESSES:
Francis McArdle.
J. H. Scarborough.

INVENTOR:
J. Butterfield
BY Munn & Co.
ATTORNEYS.

UNITED STATES PATENT OFFICE.

JOHN BUTTERFIELD, OF WOODLAWN, MISSOURI.

IMPROVEMENT IN SELF-DROPPERS FOR PLANTERS.

Specification forming part of Letters Patent No. 200,692, dated February 26, 1878; application filed October 13, 1877.

*To all whom it may concern:*

Figure 1:
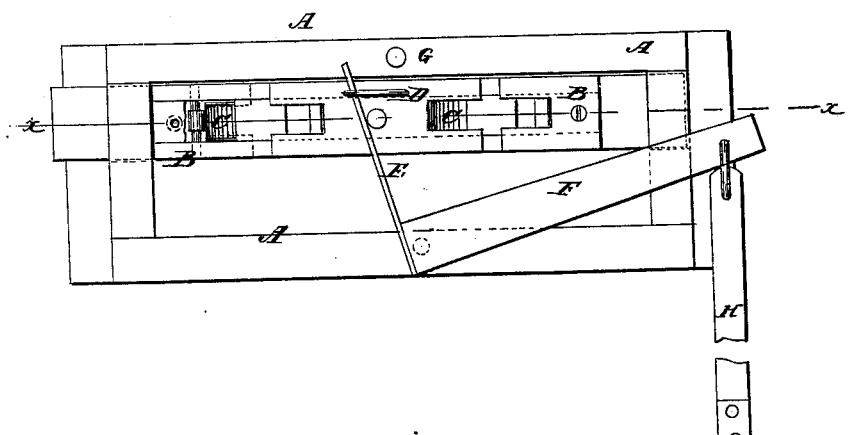
Figure 2:
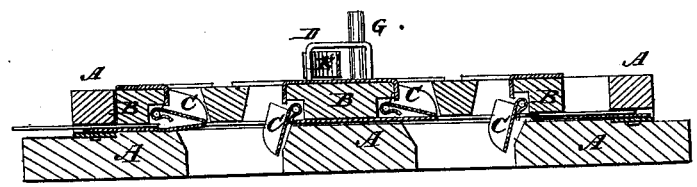

Be it known that I, JOHN BUTTERFIELD, of Woodlawn, in the county of Monroe and State of Missouri, have invented a new and useful Improvement in Self-Dropper for Planters, of which the following is a specification:

Figure 1 is a top view of my improved device. Fig. 2 is a vertical section of the same, taken through the line $x\ x$ of Fig. 1.

Similar letters of reference indicate corresponding parts.

The object of this invention is to furnish an improved device for attachment to seed-planters, to enable the seed to be dropped by the advance of the machine, and which shall be simple in construction and reliable in operation.

The invention will first be described in connection with the drawing, and then pointed out in the claim.

A represents the seed-hoppers, or a board and frame to which said hoppers are attached. B represents the dropping-slide, which works in the lower part of the hoppers A, and which may be made in one piece, or in two parts connected by a rod. In each end part of the slide B are formed two holes, in which are pivoted two small spouts, C, the said holes being of such a size as to hold, when the said spouts are raised, enough seed for a hill. The spouts C are hinged or pivoted at their outer ends, so as to drop alternately into the holes in the bottom boards of the hoppers, and discharge the seed into the conductor-spouts, through which it passes to the ground. The seed is prevented from running out through the holes in the dropping-slide B, when the spouts C are down, by rubber or other suitable cut-offs.

To the dropping-slide B is attached a keeper, D, through which passes the arm E of the lever F. The arm E may be elastic or rigid, and, when elastic, a bolt or other stop, G, should be attached to the machine, for the end of the said arm to strike against, so that the dropping-slide may be thrown by the elasticity of the said arm as it slips from the said stop.

When the arm E is rigid the stop G is not used, and the said arm may be pivoted to the dropping-slide by a bolt or keeper, as may be desired. The lever F is pivoted to the frame of the machine at or near its inner end.

To the outer end of the lever F is pivoted the end of a bar, H, which passes along the outer side of the wheel, and is pivoted to a journal formed upon the outer end of a block, I. The block I is placed between the inner ends of two spokes of the wheel, close to the hub, and is secured in place by a key extending from the said block I up to the rim of the wheel, or by any other suitable means. By this construction the slide B will be moved twice at each revolution of the wheel.

If desired, the journal-block I may be made of iron, and secured around the hub of the wheel.

Having thus described my invention, I claim as new and desire to secure by Letters Patent—

The combination of the board A, slide B, spouts C, pivoted in holes of said slide, the keeper D, spring-arm E, pin G, and lever F, all constructed and arranged as shown and described, to form a self-dropping attachment for corn-planters.

JOHN BUTTERFIELD.

Witnesses:
J. B. ASH,
T. S. ASH.